United States Patent [19]

Krebs-Yuill et al.

[11] Patent Number: 4,740,243

[45] Date of Patent: Apr. 26, 1988

[54] METAL VALUE RECOVERY FROM METAL SULFIDE CONTAINING ORES

[75] Inventors: Barbara A. Krebs-Yuill, Edmond, Okla.; Larry B. Tsai, Thousand Oaks; Rebekah Wu, Pebble Beach, both of Calif.; David A. Milligan, Edmond, Okla.; Nestor J. Troncoso, Westlake Village, Calif.

[73] Assignee: Ensci, Inc., Chatsworth, Calif.

[21] Appl. No.: 858,369

[22] Filed: Apr. 30, 1986

Related U.S. Application Data

[63] Continuation-in-part of Ser. No. 687,673, Dec. 31, 1984, abandoned, and a continuation-in-part of Ser. No. 687,674, Dec. 31, 1984, abandoned.

[51] Int. Cl.[4] ............................................. C22B 11/04
[52] U.S. Cl. ..................................... 75/101 R; 75/2; 75/115; 75/118 R; 75/121; 423/27; 423/41; 423/45; 423/53; 423/87; 423/150; 423/98; 423/109; 423/DIG. 4; 423/DIG. 17
[58] Field of Search ........................ 427/27, 29, 87, 30, 427/150, 31, 98, 41, 45, 109, 49, 52, 53, DIG. 4, DIG. 17; 75/2, 101 R, 115, 118 R, 121

[56] References Cited

U.S. PATENT DOCUMENTS

| | | | |
|---|---|---|---|
| 2,829,964 | 4/1958 | Zimmerley et al. | 423/DIG. 17 |
| 3,169,856 | 2/1965 | Mero | 423/DIG. 4 |
| 3,330,650 | 7/1967 | Zimmerley et al. | 423/DIG. 17 |
| 3,433,629 | 3/1969 | Imai et al. | 423/DIG. 17 |
| 4,002,717 | 1/1977 | Sandberg et al. | 75/101 R |
| 4,497,778 | 2/1985 | Pooley | 423/27 |

OTHER PUBLICATIONS

Tuovinen, O. H. and Kelly, D. P., "Use of Micro-Organisms for the Recovery of Metals", International Metallurgical Reviews, vol. 19, 1974, pp. 21–31.

*Primary Examiner*—Robert L. Stoll
*Attorney, Agent, or Firm*—Frank J. Uxa

[57] ABSTRACT

A process for recovering at least one first metal from a metal sulfide-containing ore comprising contacting the ore with an aqueous, acidic composition and at least one reducible manganese-containing material at conditions effective (1) to chemically reduce the manganese, (2) solubilize at least a portion of the metal from the sulfide, and (3) at least partially liberate the first metal from the ore; and recovering the first metal from the ore. The use of added ferric ion and/or *Thiobacillus ferrooxidans* bacteria in the above-noted contacting is also disclosed.

40 Claims, No Drawings

METAL VALUE RECOVERY FROM METAL SULFIDE CONTAINING ORES

This application is a continuation-in-part of co-pending applications Ser. Nos. 687,673; and 687,674; all filed on Dec. 31, 1984 and now abandoned.

This invention relates to a process for recovering at least one first metal, e.g., gold, from a ore containing metal sulfides and the first metal. In particular, the invention relates to a process for recovering the first metal which involves processing the first metal, metal sulfide-containing ore so as to facilitate the recovery of the first metal from the ore.

Metal sulfide-containing ores often contain metal values, such as gold, the platinum group metals and the like, which are difficult to recover because of the "locking" mature of the metal sulfide in the ore. For example, the occurrence of insoluble metal sulfide-locked gold ores has long been a problem for ore processors. Conventional smelting can treat small, limited quantities of metal sulfide-locked gold ores when processing conventional ores. This consumes silica, increases energy required, and contributes to metal loss in the slag.

Conventional roasting can treat the metal sulfide-locked gold ore. However, this requires large capital expenditures and often causes pollution problems.

Metal sulfide gold-containing ores may be leached with sodium cyanide to recover gold, but such recovery is often limited by the metal sulfide content. The metal sulfide in such ores "lock" the metal values (gold) in the ore, for example, by blocking access by the sodium cyanide solution to the gold medium. Significant increases in sodium cyanide consumption result from processing these ores relative to processing typical gold ores. Thus, in order to recover the gold, the metal sulfide content should be reduced to increase gold dissolution. Use of sodium cyanide to remove gold from such gold, metal sulfide-containing ores is usually uneconomical.

In an article entitled "The Cyanide Process for Gold and Silver Ores" by Frank A. Seeton appearing in *Deco Trefoil*, January–February, 1966, certain constituents are noted as cyanicides which may be present in gold and silver-containing ores. A cyanicide may be defined as a natural-occurring material that reacts with cyanide causing abnormal cyanide consumption and frequently influences dissolution and precipitation of gold and silver. Copper minerals are cyanicides and constitute a serious problem in cyanidation. Contents as low as 0.1 percent copper in the ore will create excessive cyanide consumption due to the formation of copper cyanogen complexes and, in turn, have adverse effects on gold and silver dissolution and precipitation. Chalcopyrite is the least objectionable of the copper minerals. Arsenic and antimony sulfides dissolve in the alkaline solution and form compounds which will react with the oxygen in the cyanide solution and inhibit the dissolution of gold and silver values. To a lesser degree, zinc and nickel-bearing minerals may be troublesome. Generally, reduced sulfur-containing compounds will react with cyanide to form cyanate compounds which are not effective in leaching gold or silver.

Pyrrhotite is a common constituent of gold and silver ores and is not only a cyanicide but also consumes oxygen in the solution due to the decomposition of pyrrhotite. Various remedies for these conditions have been suggested such as pre-aeration in alkaline water solutions in the absence of cyanide and discarding the pre-aeration solution prior to cyanidation or the use of metallic salt in conjunction with low lime alkalinity during cyanidation.

One known process for recovering silver from silver, manganese-containing ores is disclosed in "Wringing Manganese from Silver Ores", *Chemical Week* (Dec. 14, 1983), 30, 32. In this article, a process is described in which a proprietary leaching solution is applied to a silver, manganese-containing ore which is agitated at ambient temperatures. In the first stage, manganese is dissolved and treated with a metal carbonate. In the second stage, silver is dissolved and finally recovered by electrowinning. The leaching solution which is used for dissolving the manganese, as well as the leaching solution used to dissolve the silver, were disclosed as being proprietary.

One method to improve the cyanide extraction of silver from a silver, manganese-containing ore is disclosed in an article entitled "Cyanide Milling Practice of The Fresnillo Company", W. E. Crawford, Tran. AIME 112 (1934), 734–750. This method involves (1) grinding the ore in water to form a pulp; (2) subjecting the pulp to sulfur dioxide gas to dissolve the manganese minerals; (3) precipitating the dissolved manganese with a lime emulsion; (4) aerating the pulp; and, finally (5) cyaniding the pulp in the usual manner to recover the silver values. The article teaches that the manganese as such no longer adversely affects silver extraction, although it still remains in the pulp.

U.S. Pat. No. 2,829,964 (hereinafter referred to as '964) describes a process for leaching metals (mainly copper and iron) from metallurgical materials with a leaching agent containing ferric sulfate and sulfuric acid. This leaching process uses ferric sulfate to convert the metal to be recovered to a soluble form and produces a spent solution containing ferrous sulfate. In a separate regenerative stage, bacteria named *Thiobacillus ferrooxidans* act on the spent ferrous sulfate to oxidize it to form the necessary ferric sulfate which is recycled back to the leaching step. The bacteria may also act on iron pyrite which is optionally present in the separate regeneration step to generate the ferric sulfate leaching agent.

U.S. Pat. No. 3,433,629 (hereinafter referred to as '629) discloses a process for dissolving and recovering manganese from manganese (IV) dioxide-containing ore. The process includes the steps of adding powdered manganese dioxide-containing ore and a metal sulfide to a cultured liquid containing *Thiobacillus thiooxidans* bacteria. The '629 patent makes clear that the process utilizing *Thiobacillus thiooxidans* is based on entirely different functions from the process of the '964 patent which involves a ferric sulfate leaching agent and a separate regeneration stage utilizing *Thiobacillus ferrooxidans*. Further, the '629 patent questions the use of the '964 process with manganese-containing ores since both manganese dioxide ($MnO_2$) and ferric sulfate are of an oxidized nature. Therefore, the ferric sulfate in the leaching agent can never be reduced to the ferrous state as taught by the '964 patent. Example 3 of '629 discloses that the use of FeS, in the absence of the *Thiobacillus thiooxidans* bacteria, to dissolve manganese dioxide gave poor results.

One major disadvantage of the '629 process is the necessity to continuously supply sulfur or sulfur dioxide to the site of bacterial action. Further, the alternative suggested in '629 of mixing the ore with a nonionic surfactant is also expensive and troublesome. The process also requires the use of a large excess of sulfuric acid for maintenance of the pH in the range of about 0.5 to about 1.0. This aspect, besides increasing the initial raw material cost, requires high neutralization costs prior to the recovery of silver using cyanide.

U.S. Pat. No. 4,002,717 (hereinafter referred to as '717) discloses a method for obtaining soluble manganese salt from a high valence manganese oxide ore without solubilizing iron (from iron sulfide) and simultaneously, if desired, refining a metal (iron) sulfide ore. The '717 process involves admixing the manganese oxide ore with hydrogen sulfide or metal sulfide and sulfuric acid to form elemental sulfur and an aqueous leach solution comprising dissolved manganese sulfate. The '717 patent teaches that compounds which are polysulfides, i.e., those that contain an S—S bond, for example such as that present in iron pyrites, are inert in the '717 process.

Other U.S. patents and literature references which were reviewed in preparing this application are as follows: U.S. Pat. Nos.: 4,497,778; 3,330,650 and 3,169,856; and literature reference: Tuovinen, O. H., and Kelly, D. P., "Use of Microorganisms for the Recovery of Metals", International Metallurgical Reviews, Vol. 19, 1974, pgs. 21–31. Also see commonly assigned U.S. patent application Ser. No. 858,056, filed 4/3/86, the specification of which is hereby incorporated by reference herein. There continues to be a need for improved processing to recover metal values from metal sulfide-containing ores.

Therefore, one object of the present invention is to provide a process for recovering at least one other metal from a metal sulfide-containing ore.

Another object of the invention is to provide such a process for recovering at least one other metal from an ore containing such metal and pyrites, particularly iron pyrites.

A further object of the invention is to provide a process for the recovery of gold from a gold, metal sulfide-containing ore.

A still further object of the invention is to provide a process for the recovery of at least one other metal from a metal sulfide-containing ore utilizing certain bacteria. Other objects and advantages of the present invention will become apparent hereinafter.

An improved process for recovering at least one first metal from an ore containing the first metal and at least one of certain sulfides of a second metal other than manganese and the first metal, has been discovered. In one broad aspect, the process comprises: contacting the ore with an aqueous, acidic composition and at least one reducible manganese (e.g., manganese generally in the plus four (+4) oxidation state)-containing material, e.g., a metallurgical material, ore and the like, at conditions effective to (1) chemically reduce at least a portion of the manganese, (2) solubilize at least a portion of the second metal from the second metal sulfice in the acidic, aqueous composition, and (3) at least partially liberate the first metal from the ore; and recovering the first metal from the ore. In one embodiment, the metal sulfide has a formula of $(Me)ySx$ wherein x is greater than y and Me is a metal selected for the group consisting of Fe, Mo, As, Cu, co, Ni, Sn, Sb, Bi, Pb, Zn and mixtures thereof. Such metal sulfides preferably include at least one S—S (sulfur to sulfur) bond. Such sulfides include iron pyrites and pyrite-like metal sulfides. In another embodiment, the contacting occurs in the presence of *Thiobacillus ferrooxidans* in an amount effective to facilitate, e.g., generally to increase the rate of, the liberating of the first metal or metals from the ore. These two embodiments are meant to be inclusive and not exclusive. That is, the $(Me)ySx$ of the first embodiment may be used in conjunction with the *Thiobacillus ferrooxidans* of the second embodiment.

The present process provides substantial advantages. For example, relatively inexpensive and plentiful first metal, metal sulfide-containing ores, in particular gold, iron pyrites-containing ores, and reducible manganese-containing materials may be used. At least partial liberation of the first metal, for example, selected from gold, platinum group metals and mixtures thereof, in particular gold, is achieved, thereby providing for an effective, e.g., increased metal yield and/or reduced cost, metal recovery step. In addition, since at least a portion of the reducible manganese is reduced, the present process can be utilized to recover at least one second metal, in particular silver which is included in the reducible manganese-containing material. This material is contacted with the metal sulfide-containing ore at conditions effective to at least partially liberate the second metal from the material. The second metal is then recovered from the material.

The present contacting step results in a very desirable combination of events, e.g., chemically reducing, and preferably solubilizing, manganese; solubilizing metal from the metal sulfide; and at least partially liberating at least one first metal, and preferably at least one second metal. Effective first, and preferably second, metal recoveries are achieved. All this can be accomplished utilizing low grade (heretofore difficult to process), relatively inexpensive and plentiful ores and materials. Further the present process does not require the addition of sulfur dioxide or hydrogen sulfide to maintain or culture any bacteria.

The first metal, metal sulfide-containing ore which is used in the process of this invention may be any suitable metallic sulfide ore. Preferably, this ore includes iron sulfide, in particular iron pyrites. The metal sulfide may be in any size or form. The metal sulfide component may be intermixed with the manganese-containing material or brought in contact with the manganese-containing material by the aqueous, acidic composition which is in turn intermixed with the manganese-containing material. Metal sulfide-containing ores useful in this invention may include other minerals or compounds in amounts which do not substantially interfere or deleteriously affect the present process. The metal sulfide-containing ore also includes one or more valuable first metals, such as gold, the platinum group metals and mixtures thereof. The present contacting step provides for at least partially liberating the first metal or metals from the sulfide-containing ore, i.e., the first metal or metals are more effectively recovered from the ore after the contacting relative to the uncontacted ore. At least a portion, preferably a major portion of the first metal is liberated from the ore. This ore containing the desired first metal or metals, after contacting according to the present invention, is subjected to additional processing during which the first metal or metals are recovered from the contacted ore.

The process of this invention is useful on any suitable reducible manganese-containing material, e.g., an ore containing oxidized manganese. At least a portion of the manganese included in this material should be chemically reducible in the present contacting step. In one embodiment, the reducible manganese-containing material comprises manganese oxide i.e., $MnO_2$. Particularly, the process is useful on silver, reducible manganese-containing ores in which at least a portion of the silver is locked by the manganese such that at least a portion of the silver is not readily recovered using conventional techniques, e.g., cyanide extraction. When such ores are employed, the ores are "preconditioned" in the present contacting step so that at least a portion, preferably a major portion, of the silver is liberated from the material. By "liberated from the material" is meant that the second metal (silver) in the material after the present contacting can be more effectively recovered using conventional (cyanide extraction) processing relative to the uncontacted ore. In the process of this invention, a metal sulfide-containing material is contacted with the manganese-containing ore. In embodiments of the present invention in which the presence of *Thiobacillus ferrooxidans* is optional, the metal sulfide is preferably pyrites selected from a group consisting of iron pyrites, chalcopyrite, arsenopyrite, pyrrhotite and mixtures thereof. More preferably, the metal sulfide comprises iron pyrite.

In embodiments of the invention which require the presence of *Thiobacillus ferrooxidans* any suitable metal sulfide capable of performing at the conditions of the present contacting step, and preferably capable of being oxidized by the bacteria, may be used. Because of cost, availability and performance considerations, the preferred metal sulfide for use in these embodiments is iron sulfide, in particular iron pyrites.

The amount of reducible manganese employed in the present contacting step should be sufficient to provide the chemical reduction/solubilization/liberation to the desired degree. Preferably, the amount of reducible manganese employed should be about 100% to about 120% of that required to achieve the desired degree of sulfide metal solubilization. Substantial excesses of reducible manganese should be avoided since such excesses may result in materials separation and handling problems, and may even result in reduced recovery of the desired metal or metals.

Any suitable aqueous, acidic composition may be employed in the present process. The pH of the composition should be acidic and may vary depending, for example, on the composition of the ore or ores being treated, the composition of the reducible manganese-containing material being employed, and the presence or absence of other entities during the contacting.

Preferably, the pH of the aqueous, acidic composition is in the range of about 0.1 to about 5. However, if an effective amount of *Thiobacillus ferrooxidans* is present during the contacting, the preferred pH of the aqueous, acidic composition is in the range of about 1.5 to about 4.5, and more preferably about 3.0 and lower. Still more preferably, if an effective amount of the bacteria is present, the pH of the aqueous, acidic composition is in the range of about 2.0 to about 3.0, with excellent results obtained with a pH in the range of about 2.5 to about 3.0.

The pH of the aqueous, acidic composition may be adjusted or maintained during the contacting step, for example, by adding acid to the aqueous, acidic composition.

The aqueous, acidic composition comprises water, preferably a major amount of water. The composition is preferably substantially free of ions and other entities which have a substantial detrimental effect on the present process. Any suitable acid or combination of acids may be included in, or added to, this composition to provide the desired acidity. For example, hydrogen halides preferably hydrogen chloride, sulfurous acid, sulfuric acid metal salts which decompose (in the aqueous, acidic composition) to form such acids, mixtures thereof and the like may be employed. Because of cost, availability and performance considerations, sulfuric acid is preferred. Quantity and concentration of the aqueous, acidic composition may be selected in accordance with the requirements of any given ore to be treated and as may be found advantageous for any given mode applying the process in practice.

In one embodiment, the present contacting occurs in the presence of added ferric ion in an amount effective to facilitate the liberating of the first metal from the ore. The ferric ion may be added to the contacting step separately, e.g., as $Fe_2(SO_4)_3$ and/or other compounds which produce the desired amount of ferric ion when combined with the present aqueous, acidic composition in the contacting step. In order to more effectively control the amount of ferric ion present and to provide improved contacting, it is preferred that the added ferric ion be combined with the aqueous, acidic composition prior to the present contacting step. The amount of added ferric ion used in the present process is typically minor, when compared to the amount of ore and reducible manganese-containing material used, and may vary depending on many factors, for example, the composition of the ore or ores and of the reducible manganese-containing material and the degree of first metal liberation desired. Preferably, the added ferric ion is present in an amount of at least 10 ppm. (by weight) of the aqueous, acidic composition. More preferably, the added ferric ion is present in an amount in the range of about 0.01% to about 1.0% by weight of the aqueous, acidic solution.

In one embodiment, the present contacting occurs in the presence of *Thiobacillus ferrooxidans* bacteria in an amount effective to facilitate the liberating of the first metal from the metal sulfide-containing ore. Since the contacting preferably results in at least a portion of the manganese in the reducible manganese-containing material being dissolved in the aqueous, acidic composition and since the bacteria is preferably present in the acidic, aqueous composition, the bacteria are preferably tolerant (remain active) in such manganese-containing compositions. The aqueous, acidic compositions and the bacteria contained therein are maintained under regeneration conditions, i.e., at conditions conducive to the propagation of bacteria, during the contacting step.

As the contacting step progresses, the aqueous, acidic composition (the lixiviant solution) preferably becomes increasingly concentrated in dissolved manganese from the material, in the form of manganese sulfate if sulfuric acid is employed. Above certain high concentrations of manganese, the buildup of manganese will in turn reduce the activity of the *Thiobacillus ferrooxidans* bacteria. In practice, the contacting step is controlled, particularly through its initial stage, to produce effective quantities of adequately manganese tolerant bacteria, for example and preferably by controlling the ratio of ore or ores to reducible manganese-containing material to aqueous, acidic composition and/or the bleed rate of the manganese-containing aqueous, acidic composition to insure a safe buildup rate of manganese ions in the aqueous, acidic composition. By increasing the proportion of solids to liquid, the manganese buildup rate in the aqueous, acidic composition is increased and vice versa. The manganese concentration, the total dissolved solid, and the bacterial activity in the aqueous, acidic composition can be monitored on a periodic basis as an aid to process control.

In instances where it is not practicable or desirable to exercise the required degree of control of the contacting step throughout the period of time required for developing suitably tolerant bacteria and where, consequently, it is preferred to commence the contacting step with an adequate supply of suitably tolerant bacteria, cultures of such bacteria may be prepared by known methods. Normally, the *Thiobacillus ferrooxidans* bacteria can tolerate manganese in concentrations as shown as 2.5 weight percent. In concentrations above 2.5 weight percent, the growth of the bacteria is slowed to a point at which bacteria become inactive. However, the bacteria can be and preferably are acclimated to higher concentrations of manganese ion by slowly increasing the manganese ion concentration level in the aqueous, acidic composition. By normal acclimation techniques, the manganese tolerance of the bacteria can be increased to greater than about 4 weight percent. The bacteria are preferably acclimated as much as is possible and cost effective. Alternately, *Thiobacillus ferrooxidans* bacteria may be acclimated to higher manganese levels using chemostate techniques operating in a continuous mode.

Sources of the *Thiobacillus ferrooxidans* bacteria useful in this invention include sources such as the American Type Culture Center and bacteria found to be naturally occurring in ore bodies. Of the *Thiobacillus ferrooxidans* bacteria available from the American Type Culture Center, cultures ATCC-14119, ATCC-19859, ATCC-21834, and ATCC-33020 have been used in the process of this invention. All of these cultures have been found to be satisfactory.

The pH necessary for the bacterial action may preferably be as low as about 1.5 and as high as about 4.5 for the *Thiobacillus ferrooxidans* bacteria. However, if the bacteria are acclimated to a lower pH, the pH of the aqueous, acidic composition in the present contacting step may be adjusted accordingly.

The aqueous, acidic composition should be maintained at a temperature to provide for effective contacting. When the bacteria are employed, such temperature should be such as to not unduly inhibit the growth of or destroy the bacteria. In some instances, bacterial activity has been maintained at a temperature as high as 75 degrees C, though normal strains of the bacteria are best maintained at below about 60 degrees C. which is the preferred upper limit. While limited activity is still apparent at 5 degrees C, the preferred lower limit is about 15 degrees C. More preferably, for the bacteria participation, the contacting occurs at a temperature in the range of about 15 degrees C. to about 40 degrees C. Still more preferably, the contacting temperature is in the range of about 20 degrees C. to about 30 degrees C. Both the temperature extremes and the preferred temperature ranges may be adjusted if the bacteria are acclimated to different ranges.

The bacteria are typically cultivated with nitrogen, phosphorous and sulfate, or utilize naturally occurring nutrients. Any suitable combination of compounds or components containing these constituents may be used to culture the bacteria. Suitable compounds include ammonia, ammonium sulfate, ammonium phosphate, alkali acid phosphate mixtures thereof and the like.

Preferably, magnesium is also included in the culturing compounds or components and suitable magnesium content may be provided by adding magnesium sulfate.

In utilizing the process of this invention, certain precautions should preferably be taken to improve performance. For example, the raw materials and equipment utilized throughout the processing circuit should normally be such as will not release or act as bactericides under the conditions prevailing during the process. Minerals which may be harmful to the bacteria include cobalt, zinc, nickel, copper, mercury, and molybdenum. Concentrations of these minerals found in pyrites normally do not exceed levels which would be harmful to the bacteria. Element concentrations which would be harmful to the bacteria are illustrated in *Zitzchriferology Microbiology*, 12/72, 310. However, as with the manganese, these concentrations may be exceeded by the use of bacteria which have been acclimated to the harmful mineral.

The action of the bacteria on iron pyrite may produce an effective addition of sulfuric acid to the aqueous, acidic composition during the contacting step. Without limiting this invention to any theory or chemical/physical mechanism, it is postulated that this reaction is as follows:

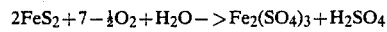

$$2FeS_2 + 7\tfrac{1}{2}O_2 + H_2O \longrightarrow Fe_2(SO_4)_3 + H_2SO_4$$

In instances where the contacting step results in reducing the sulfuric acid content to the aqueous, acidic composition without a corresponding decrease in the ferric ion content, hydrolysis of the ferric sulfate is postulated to form sulfuric acid by the following reaction:

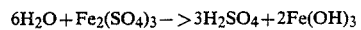

$$6H_2O + Fe_2(SO_4)_3 \longrightarrow 3H_2SO_4 + 2Fe(OH)_3$$

This results in the precipitation of ferric salts. A controlled amount of oxygen, such as oxygen from air, is present in order to promote bacterial growth.

In order to utilize normal recovery techniques for the second metal (silver) content of a second metal, reducible manganese-containing ore, the manganese content of the ore does not need to be reduced or eliminated. The second metal (silver) is at least partially liberated from the ore. In other words, the manganese is at least partially disassociated from the silver, and not necessarily removed from the ore. In order to disassociate the manganese from the second metal (silver), the manganese is preferably solubilized, for instance, as manganese sulfate. Desirably, the manganese sulfate may be removed from physical mixture with the second metal (silver) and redeposited within the ore such that the liquid effluent from the process is not overly laden with the manganese sulfate since this sulfate may be an environmental concern.

The present process may be conducted on a batch or continuous basis. The present contacting step may be conducted on a pad, with the ore or ores to be treated situated in a heap; or in a vat, tank or other suitable arrangement. The primary criterion for the contacting step is that the desired manganese chemical reduction/sulfide metal solubilization/first metal liberation takes place. Preferably, the first metal, metal sulfide-containing ore and reducible manganese-containing material are brought together to form an intimate admixture generally with the aqueous, acidic composition. If bacteria are employed, it is preferred that this intimate admixture also include the bacteria. If bacteria are utilized, the aqueous, acidic composition preferably includes one or more nutrients useful by the bacteria. One or more of these nutrients may be included with one or more of the ore, reducible manganese-containing material, intimate admixture and aqueous, acidic composition. Additional amounts of acid and/or ferric ion may be added during the contacting to provide the desired pH and ferric ion concentration.

The solid ore/material remaining after the contacting step may be subjected to any suitable metal recovery processing step or steps for the recovery of the first metal, e.g., gold, the platinum group metals and the like, and the second metal, e.g., silver. For example, this solid ore/material may be neutralized with any suitable basic material, such as white lime or milk of lime, and then subjected to a conventional sodium cyanide extraction, followed by activated carbon treatment and zinc dust precipitation. Alternately, the solid ore/material after contacting can be neutralized and subjected to an ammonium thiosulfate or an acid thiourea extraction followed by zinc dust precipitation. Still further, the solid ore/material after contacting can be subjected to a brine extraction followed by ion exchange to recover the desired metal or metals. The conditions at which these various recovery processing steps take place are conventional and well known in the art, and therefore are not described in detail here. However, it is important to note that conducting the metal recovery processing on the ore/material after the contacting of the present invention provides improved metal recovery performance relative to conducting the same metal recovery processing without this contacting.

One processing arrangement which provides outstanding results involves the agglomeration of the first metal, metal sulfide-containing ore and the reducible manganese-containing material. The ore and material are preferably subjected to crushing, grinding, or the like processing to reduce particle size to that desired for optimum metallurgical liberation, generally a particle diameter of about ½ inch or less. The ore and material particles are mixed with sufficient aqueous acid ($H_2SO_4$), and if desired, bacteria. This intimate admixture is formed into agglomerates by conventional processing, such as extruding, pilling, tableting and the like.

The agglomerates are placed on a pad, to form a heap which is built up by addition of agglomerates, preferably over a period of time in the range of about 15 days to about 60 days. During the time the heap is being built up, and preferably for a period of time ranging up to about 3 months, more preferably about 2 months to about 3 months after the last agglomerates are added to the heap, an aqueous, acidic ($H_2SO_4$) composition is made to flow through the heap, e.g., from the top to the bottom of the heap. If bacteria are used, the aqueous, acidic composition includes one or more nutrients for the bacteria. After contacting the heap, the aqueous, acidic composition is collected and processed for disposal, processed for manganese and/or sulfide metal recovery, and/or recycled to the heap. This contacting provides another important benefit in that at least a portion of the cyanacides, such as copper, which may be present in the ore and/or metal sulfide-containing material is removed and/or deactivated. Such cyanacides cause substantial increases in cyanide consumption if present in cyanide extraction processing. Therefore, removing and/or deactivating cyanacides in the present contacting step provides for more effective metals recovery by cyanide extraction.

After the heap-aqueous, acidic composition contacting has proceeded to the desired extent, an aqueous basic (e.g., white lime, mile of lime or the like basic components) composition is contacted with the heap to neutralize the heap. After this neutralization, the agglomerates are placed on a second heap, which is preferably larger than the heap previously described.

However, it is preferred that the neutralized agglomerates be broken apart and reagglomerated prior to being placed on the second heap. This can be done using conventional means, such as subjecting the agglomerates to grinding, milling or the like processing, and then forming the second agglomerates by extruding, tableting, pilling, pelletizing or the like processing.

In any event, if a second, preferably larger, heap is formed on a pad, and a dilute aqueous cyanide, preferably sodium cyanide, solution is made to contact the second heap. Typically, this cyanide contacting is performed in the presence of air. Preferably, the cyanide solution is percolated through the second heap. The cyanide solution, after being contacted with the second heap, contains the first metal (gold) from the first metal (gold), metal sulfide-containing ore and possibly silver from the silver, reducible manganese-containing material. This solution is collected and sent to conventional further processing for recovery of gold and silver.

Both heaps are preferably maintained at ambient conditions e.g., of temperature and pressure. Also, both heaps may be built up and worked (contacted) with the aqueous, acidic composition and the cyanide solution for as long as the economics of the particular application involved remain favorable.

The following non-limiting Examples illustrate certain aspects of the present invention. However, these illustrations are not to be considered as limitations on the invention.

EXAMPLES 1 TO 4

These examples illustrate the present process for the recovery of (1) silver from a silver, manganese-containing ore and (2) gold from a gold, iron-pyrite containing ore.

A culture of *Thiobacillus ferrooxidans* bacteria (ATCC-33020) was grown under autotrophic conditions in shake flasks containing 10 liters of mineral medium. The medium contained $KH_2PO_4$ (0.4 gr./L.), $(NH_4)_2SO_4$ (0.8 gr./L.), $MgSO_4.7H_2O$ (0.16 gr./L.), and $FeSO_4$ (5 gr./L.). The pH of the medium was adjusted to and maintained at 2.5 using 1N of $H_2SO_4$. The bacterial culture was shaken at 200 rpm at room temperature (about 22 degrees C.) to insure adequate aeration and mixing. Ferrous sulfate was the sole energy source for the growth of *Thiobacillus ferrooxidans* bacteria.

The bacteria, at late exponential phase growth, were harvested by centrifiguration. A pellet of the harvested bacteria was transferred and resuspended in a shake flask containing 10 liters of the test solution. The test solution contained $KH_2PO_4$ (0.4 gr./L.), $(NH_4)_2SO_4$ (0.8 gr./L.), $MgSO_4$ (0.16 gr./L.), $Fe_2(SO_4)_3$ (5 gr./L.), 60 gr. of the respective 100 mesh gold, iron pyrites-containing ore from two locations—designated Pyrite Ore 1 and Pyrite Ore 2, respectively and 200 gr. of a silver, reducible manganese-containing ore which contained 6.23 troy ounce per ton of silver, 1.8% by weight of iron and 9.7% by weight of reducible manganese (all calculated as elemental metal). Both Pyrite Ores 1 and 2 included gold in an amount such that it would be economically attractive to recover the gold. The iron pyrites in the Pyrites 1 and 2 reduces the economic attractiveness of such gold recovery, and it would be advantageous to liberate at least a portion of the gold form the gold, pyrite ores before subjecting the ores to gold recovery processing.

The flask, containing the above-noted components was aerobically shaken at room temperature and at a speed of 200 rpm for 41 days. The pH of the test solution was initially 2.5 using 2N of sulfuric acid and the pH was adjusted, as necessary to 2.5 with 2N of sulfuric acid.

A control solution was prepared in a similar way using an identical test solution, except that *Thiobacillus ferrooxidans* were not present.

After 41 days, the relative amount of manganese dissolved in each of the test solutions was determined based on manganese analysis of the liquid using an inductively coupled plasma emission spectrometer. Results of these determinations are shown in Table 6.

TABLE 6

| Example | Pyrite Ore | Bacteria | Relative Amount of Total Manganese Dissolved |
|---|---|---|---|
| 1 | 1 | No | 12.2 |
| 2 | 1 | Yes | 13.4 |
| 3 | 2 | No | 12.8 |
| 4 | 2 | Yes | 12.8 |

These results show that iron pyrites, with and without *Thiobacillus ferrooxidans*, is effective to reduce and solubilize manganese from a silver, manganese-containing ore. In each of Examples 33 to 36, the final aqueous, acidic composition, the test solution, also contained dissolved iron from the iron pyrites. The silver in the manganese-containing ore after the contacting was more responsive to recovery, e.g., by conventional cyanide extraction, relative to that in the untreated ore.

The remaining solid, containing gold and silver, from each of runs noted above was centrifuged, washed, dried and then subjected to a laboratory cyanide extraction for gold recovery. This laboratory extraction is known to provide results which are reasonably correlatable to results obtained in commercial cyanide extraction operations. The amount of total gold extracted for each of the Examples is shown in Table 7.

TABLE 7

| Example | Pyrite Ore | Bacteria | % of Gold Extracted |
|---|---|---|---|
| 1 | 1 | No | 26.2 |
| 2 | 1 | Yes | 93.1 |
| 3 | 2 | No | 65.2 |
| 4 | 2 | Yes | 80.2 |

The amount of gold extracted in each of Example 1 to 4 is increased relative to the amount of gold that can be recovered from Pyrite Ore 1 and 2, respectively, without the above-noted treatment.

These results indicate that manganese, silver-containing ore, with and without *Thiobacillus ferrooxidans*, is effective to at least partially liberate gold from a gold, pyrite-containing ore. The presence of the bacteria does provide for substantially improved gold recoveries. This is surprising since the amounts of manganese dissolved would appear not to be substantially affected by the presence of bacteria. This indicates that the reduction or dissolving of manganese by itself does not necessarily relate to the degree of total silver/gold liberation from the ores by the above processes. In other words, this makes clear that the chemical reduction of manganese and the total liberation of silver/gold from the ore by the process of this invention are unexpected and distinct.

While the present invention has been described with respect to various specific examples and embodiments, it is to be understood that the present invention is not limited thereto and that it can be variously practiced within the scope of the following claims.

The embodiments of the present invention in which an exclusive property or privilege is claimed are as follows:

1. A process for recovering at least one first metal selected from the group consisting of gold, silver, the platinum group metals and mixtures thereof from an ore containing said first metal and a sulfide of a second metal other than manganese comprising: contacting said ore with an aqueous, acidic composition and at least one manganese-containing material in the presence of ferric ion at conditions effective to (1) chemically reduce manganese, (2) solubilize second metal from said sulfide in said aqueous, acidic composition, and (3) liberate first metal from said ore; and recovering said first metal from said ore.

2. The process of claim 1 wherein said first metal is gold.

3. The process of claim 1 wherein said contacting occurs in the presence of added ferric ion.

4. The process of claim 2 wherein said contacting occurs in the presence of added ferric ion.

5. The process of claim 1 wherein the pH of said aqueous, acidic composition is in the range of almost 0.5 to about 5.0 and said aqueous acidic composition contains sulfuric acid.

6. The process of claim 4 wherein the pH of said aqueous, acidic composition is in the range of about 0.5 to about 5.0 and said aqueous, acidic composition contains sulfuric acid.

7. The process of claim 4 wherein the pH of said aqueous, acidic composition is in the range of about 0.5 to about 5.0 and said aqueous, acidic composition contains sulfuric acid.

8. The process of claim 1 wherein said sulfide is iron pyrites.

9. The process of claim 7 wherein said contacting occurs in the presence of *Thiobacillus ferrooxidans* and the pH of the aqueous, acidic composition is about 3.0 and lower.

10. The process of claim 1 wherein said material contains silver and manganese; said contacting occurs at conditions effective to liberate silver from said material; and said process further comprises recovering silver from said material.

11. The process of claim 2 wherein said material contains silver and manganese; said contacting occurs at conditions effective to liberate silver from said material; and said process further comprises recovering silver from said material.

12. The process of claim 4 wherein said material contains silver and manganese; said contacting occurs at conditions effective to liberate silver from said material; and said process further comprises recovering silver from said material.

13. A process for recovering at least one first metal selected from the group consisting of gold, silver, the platinum group metals and mixtures thereof from an ore containing said first metal and a sulfide of a second metal other than manganese comprising: contacting said ore with an aqueous, acidic composition and at least one manganese-containing material in the presence of ferric ion at conditions effective to (1) chemically reduce manganese, (2) solubilize second metal from said second metal sulfide, and (3) liberate first metal from said ore, provided that said contacting occurs in the presence of *Thiobacillus ferrooxidans;* and recovering said first metal from said ore.

14. The process of claim 13 wherein said first metal is gold, and said contacting occurs in the presence of oxygen.

15. The process of claim 13 wherein said first metal is gold.

16. The process of claim 13 wherein said contacting occurs in the presence of added ferric ion.

17. The process of claim 15 wherein said contacting occurs in the presence of added ferric ion.

18. The process of claim 13 wherein the pH of said aqueous, acidic composition is in the range of about 1.5 to about 4.5.

19. The process of claim 17 wherein the pH of said aqueous, acidic composition is about 3.0 and lower and said aqueous, acidic composition contains sulfuric acid.

20. The process of claim 17 wherein the pH of said aqueous, acidic composition is about 3.0 and lower and said aqueous, acidic composition contains sulfuric acid.

21. The process of claim 13 wherein said material contains silver and manganese; said contacting occurs at conditions effective to liberate silver from said material; and said process further comprises recovering silver from said material.

22. The process of claim 1 wherein said ore and said material are agglomerated and the resulting agglomerates are placed to form a first heap which is contacted with said aqueous acidic composition.

23. The process of claim 2 wherein said ore and said material are agglomerated and the resulting agglomerates are placed to form a first heap which is contacted with said aqueous acidic composition.

24. The process of claim 3 wherein said ore and said material are agglomerated and the resulting agglomerates are placed to form a first heap which is contacted with said aqueous acidic composition.

25. The process of claim 13 wherein said ore, said material and said *Thiobacillus ferrooxidans* are agglomerated and the resulting agglomerates are placed to form a first heap which is contacted with said aqueous acidic composition.

26. The process of claim 22 wherein said agglomerates after said contacting are reagglomerated and placed on a second heap which is contacted with aqueous cyanide solution to solubilize gold.

27. The process of claim 23 wherein said agglomerates after said contacting are reagglomerated and placed on a second heap which is contacted with aqueous cyanide solution to solubilize gold.

28. The process of claim 24 wherein said agglomerates after said contacting are reagglomerated and placed on a second heap which is contacted with aqueous cyanide solution to solubilize gold.

29. The process of claim 25 wherein said agglomerates after said contacting are reagglomerated and placed on a second heap which is contacted with aqueous cyanide solution to solubilize gold.

30. The process of claim 1 wherein said sulfide has a formula of $(Me)_y S_x$ wherein x is greater than y and Me is a metal selected from the group consisting of Fe, Mo, As, Cu, Co, Ni, Sn, Sb, Bi, Pb, Zn and mixtures thereof.

31. The process of claim 1 wherein said sulfide includes at least one sulfur to sulfur bond.

32. The process of claim 1 wherein said contacting occurs in the presence of oxygen.

33. The process of claim 13 wherein said sulfide includes at least one sulfur to sulfur bond.

34. The process of claim 3 wherein said contacting occurs in the presence of oxygen.

35. The process of claim 2 wherein said sulfide has a formula of $(Me)_y S_x$ wherein x is greater than Y and Me is a metal selected from the group consisting of Fe, Mo, As, Cu, Co, Ni, Sn, Sb, Bi, Pb, Zn and mixtures thereof.

36. The process of claim 4 wherein said sulfide has a formula of $(Me)_y S_x$ wherein x is greater than y and Me is a metal selected from the group consisting of Fe, Mo, As, Cu, Co, Ni, Sn, Sb, Bi, Pb, Zn and mixtures thereof.

37. The process of claim 2 wherein said sulfide includes at least one sulfur to sulfur bond.

38. The process of claim 4 wherein said sulfide includes at least one sulfur to sulfur bond.

39. The process of claim 4 wherein said contacting occurs in the presence of oxygen.

40. The process of claim 6 wherein said contacting occurs in the presence of oxygen.

* * * * *

UNITED STATES PATENT AND TRADEMARK OFFICE
CERTIFICATE OF CORRECTION

PATENT NO. : 4,740,243

DATED : April 26, 1988

INVENTOR(S) : Barbara A. Krebs-Yuill, Larry B. Tsai, Rebekah Wu, David A. Milligan and Nestor J. Troncoso It is certified that error appears in the above-identified patent and that said Letters Patent is hereby corrected as shown below:

Column 7, line 14; delete "shown" and insert in place thereof --high--.

Signed and Sealed this

Seventeenth Day of January, 1989

Attest:

DONALD J. QUIGG

Attesting Officer

Commissioner of Patents and Trademarks